United States Patent
Lin et al.

(10) Patent No.: US 6,175,327 B1
(45) Date of Patent: Jan. 16, 2001

(54) GPS RECEIVERS WITH ADAPTIVE ANTENNA SYSTEMS FOR SUPPRESSING INTERFERENCE SIGNALS

(75) Inventors: Zhen-biao Lin, West Hills; Seymour Robin, Woodland Hills, both of CA (US)

(73) Assignee: Sensors Systems, Inc., Chatsworth, CA (US)

( * ) Notice: Under 35 U.S.C. 154(b), the term of this patent shall be extended for 0 days.

(21) Appl. No.: 09/232,573

(22) Filed: Jan. 16, 1999

(51) Int. Cl.[7] .......................... H01Q 21/06; H01Q 21/24; H04B 7/10
(52) U.S. Cl. ................... 342/357.06; 342/361; 342/362; 342/363; 342/365; 342/378; 342/379; 342/357.01
(58) Field of Search .................. 342/357.01–357.17, 342/378–384, 13–19, 362, 368, 363–367

(56) References Cited

U.S. PATENT DOCUMENTS

| | | | |
|---|---|---|---|
| 5,347,284 | 9/1994 | Volpi et al. ........................ | 342/352 |
| 5,694,416 | * 12/1997 | Johnson ........................... | 342/368 X |
| 5,712,641 | * 1/1998 | Casabona et al. .................. | 342/362 |
| 5,818,389 | * 10/1998 | Lazar ................................. | 342/383 |

\* cited by examiner

*Primary Examiner*—Bernarr E. Gregory
(74) *Attorney, Agent, or Firm*—Koppel & Jacobs

(57) ABSTRACT

GPS receivers are provided that reduce all types of interference signals with a simple receiver structure that includes an antenna system having a reference antenna element and a plurality of auxiliary antenna elements, a plurality of phase shifters and a power combiner. The receiver also includes a downconverter, a digital GPS processor and an analog-to-digital converter (ADC). Each antenna element generates a single output signal in response to all polarization components of a GPS signal. In response to a composite signal of interference signals and GPS signals, the reference antenna element provides a reference signal and the auxiliary antenna elements provide auxiliary signals which each has a phase difference from the reference signal that is a function of its respective auxiliary antenna element's location in an antenna array space and of paths of the interference signals. The phase shifters facilitate phase adjustment of at least one of the auxiliary signals to thereby reduce the amplitude of the combined signal and thereby reduce the contribution of the interference signal below a selected threshold. The reference signal has a reference signal gain and each of N auxiliary signals has an auxiliary signal gain substantially equal to 1/N times the reference signal gain. This fixed amplitude relationship further reduces the contribution of the interference signal while simplifying the receiver structure and lowering its cost. Preferably, a signal processor is responsive to the ADC and is programmed to adjust the phase shifters to reduce the combined signal.

29 Claims, 4 Drawing Sheets

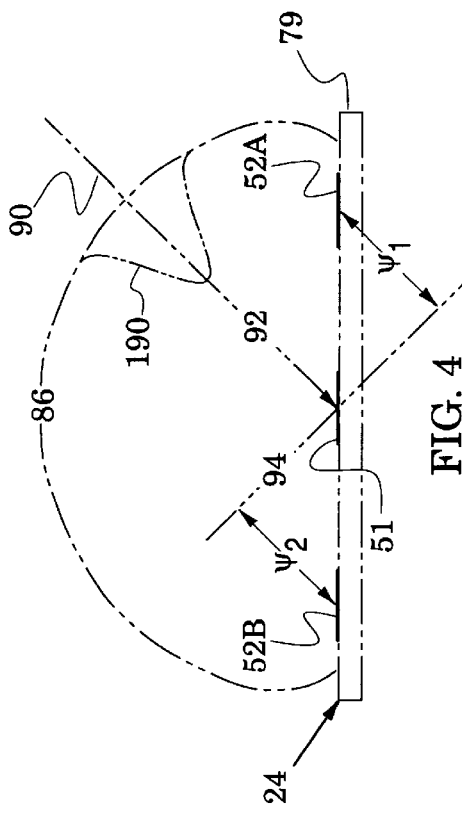
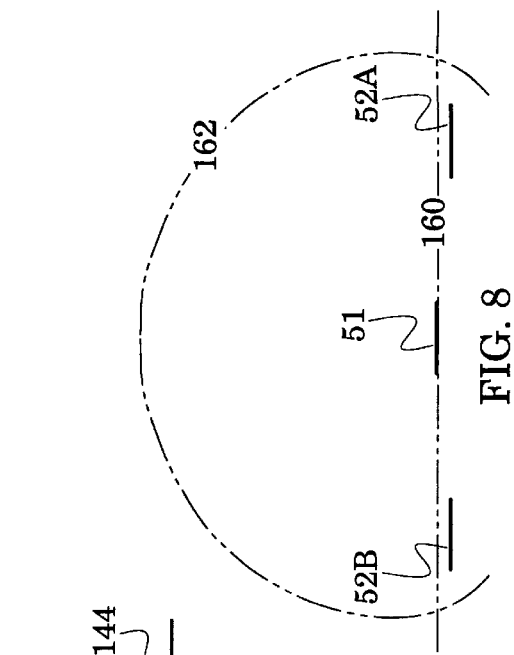
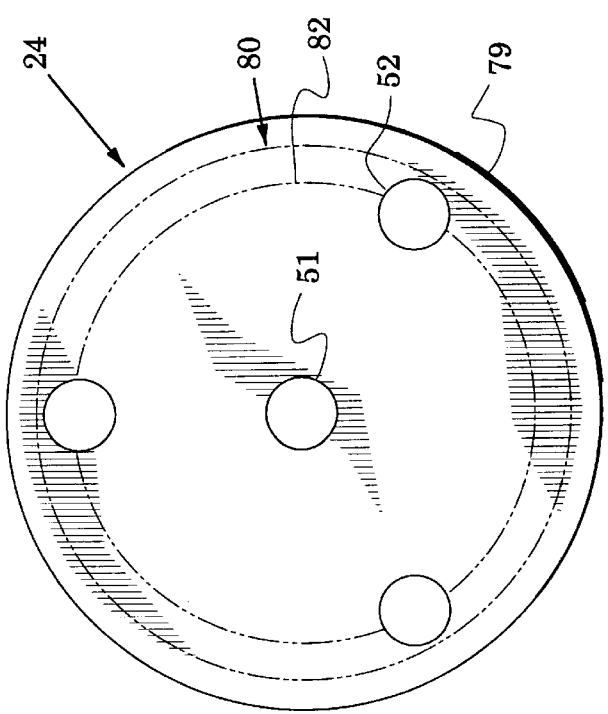
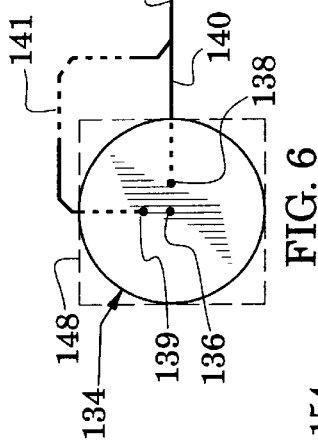
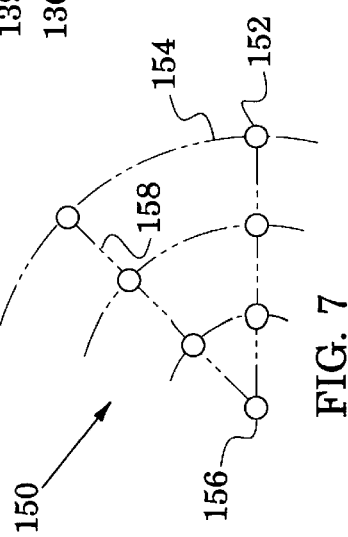

GPS RECEIVERS WITH ADAPTIVE ANTENNA SYSTEMS FOR SUPPRESSING INTERFERENCE SIGNALS

BACKGROUND OF THE INVENTION

1. Field of the Invention

The present invention relates generally to the Global Positioning System (GPS) and more particularly, to GPS receivers and GPS antenna systems.

2. Description of the Related Art

The GPS includes a constellation of 24 satellites that are positioned with four satellites in each of six orbital planes. The satellite orbits are nearly circular and their orbital planes are inclined from the equator by 55° and spaced 60° apart at the equator.

Each GPS satellite transmits right hand circularly-polarized (RHCP) signals at two carrier frequencies—L1 at 1575.42 MHz and L2 at 1227.6 MHz. The carriers are modulated by navigation data and by ranging codes. The latter are spread spectrum codes having a unique pseudo-random noise (PRN) sequence associated with each satellite. With the navigation data, a GPS receiver determines the satellite's location at the time of signal transmission and with the ranging codes, it determines time and the satellite-to-receiver range and velocity.

In particular, the navigation data includes updated information on the satellite's orbit (e.g., eccentricity, inclination and mean anomaly) so that a GPS receiver can accurately determine satellite location. To utilize the ranging codes, the receiver replicates the PRN sequence of a received signal and time shifts this sequence in a code tracking loop until it correlates with the received sequence. The required time shift is indicative of the distance between the receiver and that satellite.

Typically, the receiver also determines its velocity by processing carrier phase in a carrier tracking loop to detect Doppler frequency shifts and thereby, the receiver-to-satellite velocity. Although the receiver's clock generally has an offset from the GPS system time, redundant information from several satellites (generally four or more) can be processed by least squares estimation techniques to identify the offset and reduce its effect.

Two PRN ranging codes are transmitted from the GPS satellites; a "short" coarse/acquisition (C/A) code having a 1,023 chip sequence length, a $1.023 \times 10^6$ chip rate and a resultant 1 millisecond period and a "long" precision (P) code having a $6.1871 \times 10^{12}$ chip sequence length, a $10.23 \times 10^6$ chip rate and a resultant seven day period. Received GPS signal levels generally do not exceed −123 dBm and −125.5 dBm for the C/A code and P code components on the L1 channel and −128 dBm for either code on the L2 channel. Although these GPS signals are below (e.g., ~20 dB) thermal noise in the bandwidth of a typical GPS receiver, they can be acquired and tracked because processing gains of the C/A and P codes are respectively on the order of 43 and 53 dB.

GPS signal acquisition and tracking becomes more difficult, however, when the GPS receiver is subjected to interference signals. These signals can be unintentional (e.g., radio, television and radar transmissions) or intentional (e.g., wideband-Gaussian and spread spectrum jammer signals and narrow-band swept jammer signals). A GPS receiver in an advanced missile guidance system, for example, may be threatened by intentional jammers whose interference signals result in receiver failure or unreliable tracking (e.g., missing synchronization in the code tracking loop).

Various responses have been proposed to interference signals. In an exemplary one, U.S. Pat. No. 5,712,641 provides antenna structures that decompose a GPS signal into two orthogonally-polarized signals which are then processed through a two-stage polarimeter. In each polarimeter stage, each input signal passes through its own phase shifter and the output signals are combined in a 90° hybrid. The delta port of the final 90° hybrid generates a difference signal which is passed on to conventional GPS receiver circuits and is also processed in a control loop to adjust the phase shifters so as to null the signal at the delta port.

In an exemplary adjustment process, one phase shifter of the second stage is set to five different settings and, for each setting, the other second-stage phase shifter is stepped over a 180° range. The settings that produce the least delta signal are selected and this entire process is then repeated with the first-stage phase shifters. Subsequently, one second-stage phase shifter is fine tuned in several steps over a narrow range and left at the setting that achieved the lowest delta signal. This fine tuning process is then repeated with one first-stage phase shifter. The narrow range is further narrowed and the entire fine tuning process is repeated to again reduce the delta signal.

In U.S. Pat. No. 5,694,416, an exemplary antenna array has four antenna elements and a downconverter structure (e.g., a serial connection of a pre-selector, two mixers, bandpass and lowpass filters, an ADC and a digital equalizer) dedicated to each antenna element. Five tracking channels are each coupled to each of the equalizers. Each tracking channel includes code despreaders and I/Q accumulators for carrier and code tracking.

At baseband in the fifth channel, an interference data generator receives non-despread but accumulated signals and forms an estimate of the non-despread but accumulated interference data. This data is used in correlators to spread interference energy while coherently adding satellite energy over a correlation interval.

U.S. Pat. No. 5,347,284 describes antenna, downconverter, ADC and baseband processors in which null zone processing is included in the ADC to provide a degree of immunity to continuous wave (CW) interference signals. In particular, threshold detectors sense the portions of time the downconverted and digitized signals spend at low, average and high thresholds. Because a CW signal spends a larger portion of time near the low and high thresholds than spread spectrum signals, its presence can be sensed and, in response, weights applied to the digitization process to attenuate low and high signals and, thereby, reduce CW signal strength.

Although the systems described above may enhance the ratio of GPS-to-interference signal strength, the polarimeter of U.S. Pat. No. 5,712,641 is a complex microwave structure and its alignment process is lengthy and time-consuming, the approach of U.S. Pat. No. 5,694,416 is hardware intensive for it requires a receiver downconverter for each antenna element and applications of the teachings of U.S. Pat. No. 5,347,284 are limited to CW interference signals.

SUMMARY OF THE INVENTION

The present invention is directed to GPS receivers that reduce all types of interference signals with receiver structures of minimal complexity that are economical to produce and that facilitate rapid interference-reduction procedures. In particular, the invention is directed to GPS receivers for reducing the contribution of at least one interference signal while receiving a composite signal that includes the interference signal and at least one circularly-polarized GPS signal wherein the interference signal propagates along an associated interference signal path.

These receivers include an antenna having a reference antenna element and a plurality of auxiliary antenna elements, a plurality of phase shifters, a power combiner, a downconverter, a digital GPS processor and an analog-to-digital converter (ADC). Each antenna element generates a single output signal in response to all polarization components of the GPS signal and, in response to the composite signal, the reference antenna element provides a reference signal and the auxiliary antenna elements provide auxiliary signals which each has a phase difference from the reference signal that is a function of its respective auxiliary antenna element's location in the antenna array space and of the interference signal path.

The phase shifters are each coupled to vary the phase of a respective one of the auxiliary signals and the power combiner is coupled to the reference antenna element and to the phase shifters to combine the reference signal and the auxiliary signals into a combined signal. The downconverter reduces the frequency of the combined signal and the ADC couples the downconverter to the GPS processor. Accordingly, the phase shifters facilitate phase adjustment of at least one of the auxiliary signals to thereby reduce the amplitude of the combined signal and thereby reduce the contribution of the interference signal.

In a receiver embodiment, the reference signal has a reference signal gain and each of the auxiliary signals have an auxiliary signal gain substantially equal to 1/N times the reference signal gain. This fixed amplitude relationship further reduces the contribution of the interference signal while simplifying the receiver structure and lowering its cost.

Preferably, a signal processor is responsive to the ADC and is programmed to adjust the phase shifters to reduce the combined signal, i.e., conduct a search for phase-adjustment combinations of the auxiliary signals that reduce the combined signal.

GPS antennas of the invention are particularly structured to facilitate their installation on planar and nonplanar surfaces (e.g., missile and airplane surfaces).

The novel features of the invention are set forth with particularity in the appended claims. The invention will be best understood from the following description when read in conjunction with the accompanying drawings.

BRIEF DESCRIPTION OF THE DRAWINGS

FIG. 3 is an enlarged plan view of a GPS antenna of FIG. 2;

FIG. 4 is a side view of the GPS antenna of FIG. 3;

FIG. 6 is an enlarged view of a patch antenna in the GPS antenna of FIG. 3;

FIG. 7 is a view similar to FIG. 3 which illustrates a portion of a generic GPS antenna of the invention;

FIG. 8 is a view similar to FIG. 4 that shows a side view of a nonplanar antenna.

DETAILED DESCRIPTION OF THE PREFERRED EMBODIMENTS

Figure 1:
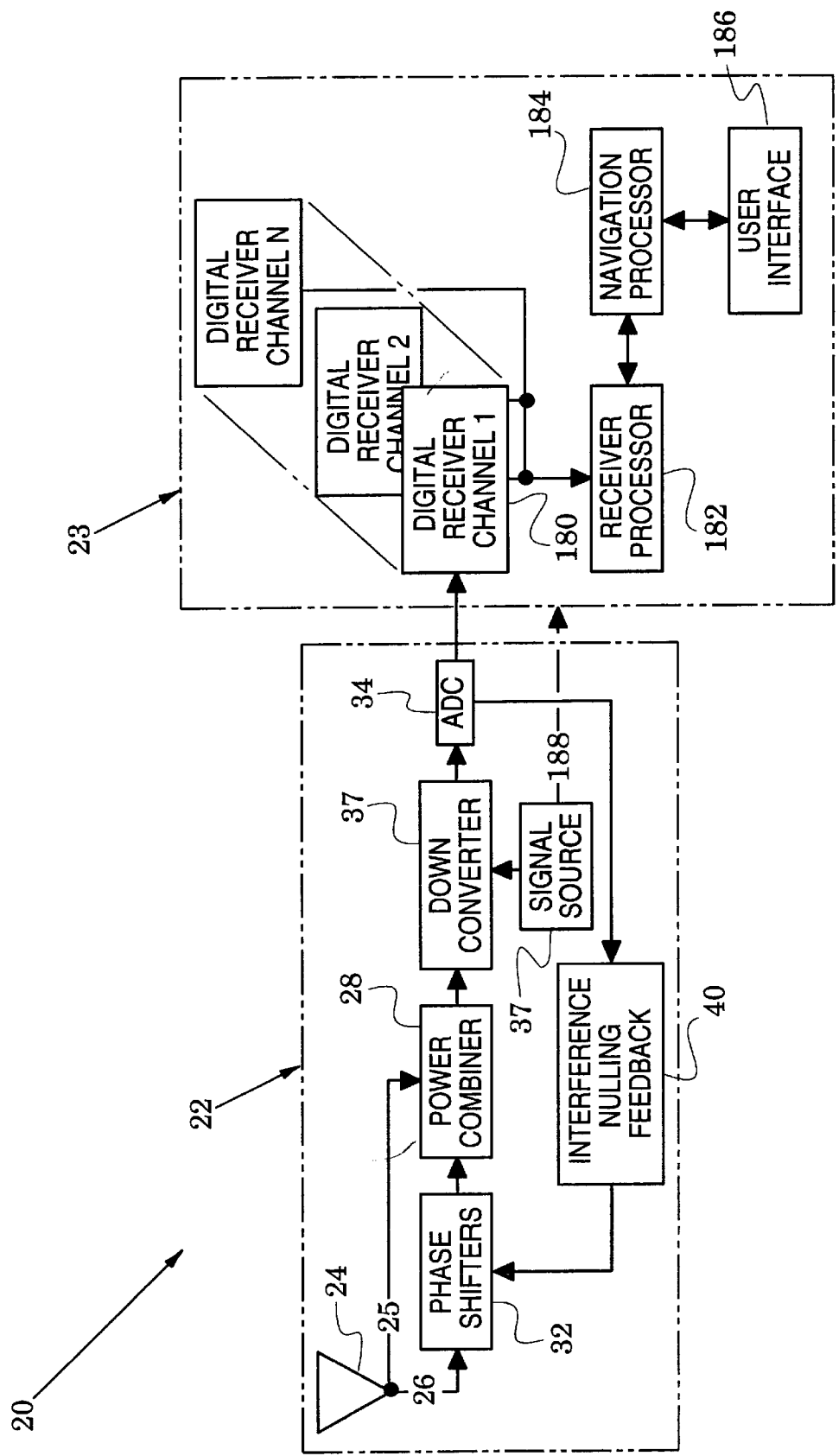
FIG. 1 is a block diagram of a GPS receiver of the present invention.

FIG. 1 illustrates a GPS receiver 20 which can reduce all types of interference signals with a simple, economical structure. The GPS receiver 20 has an interference-nulling microwave downconverter system 22 coupled to a digital GPS processor 23. The downconverter system 22 includes an antenna 24 that generates a reference signal 25 and a plurality of auxiliary signals 26. The reference signal 25 is passed to a power combiner 28 and the auxiliary signals are coupled through phase shifters 32 to the power combiner.

An analog-to-digital converter (ADC) 34 is coupled to the power combiner 28 by a downconverter 36 which receives local oscillator signals from a signal source 37. An interference-nulling feedback loop 40 couples the output of the ADC 34 back to the phase shifters 32. The ADC output also passes to the GPS processor 22. An examination of portions of the GPS processor 23 is preceded by the following description of FIG. 2 which illustrates details of the microwave downconverter system 22

Figure 2:
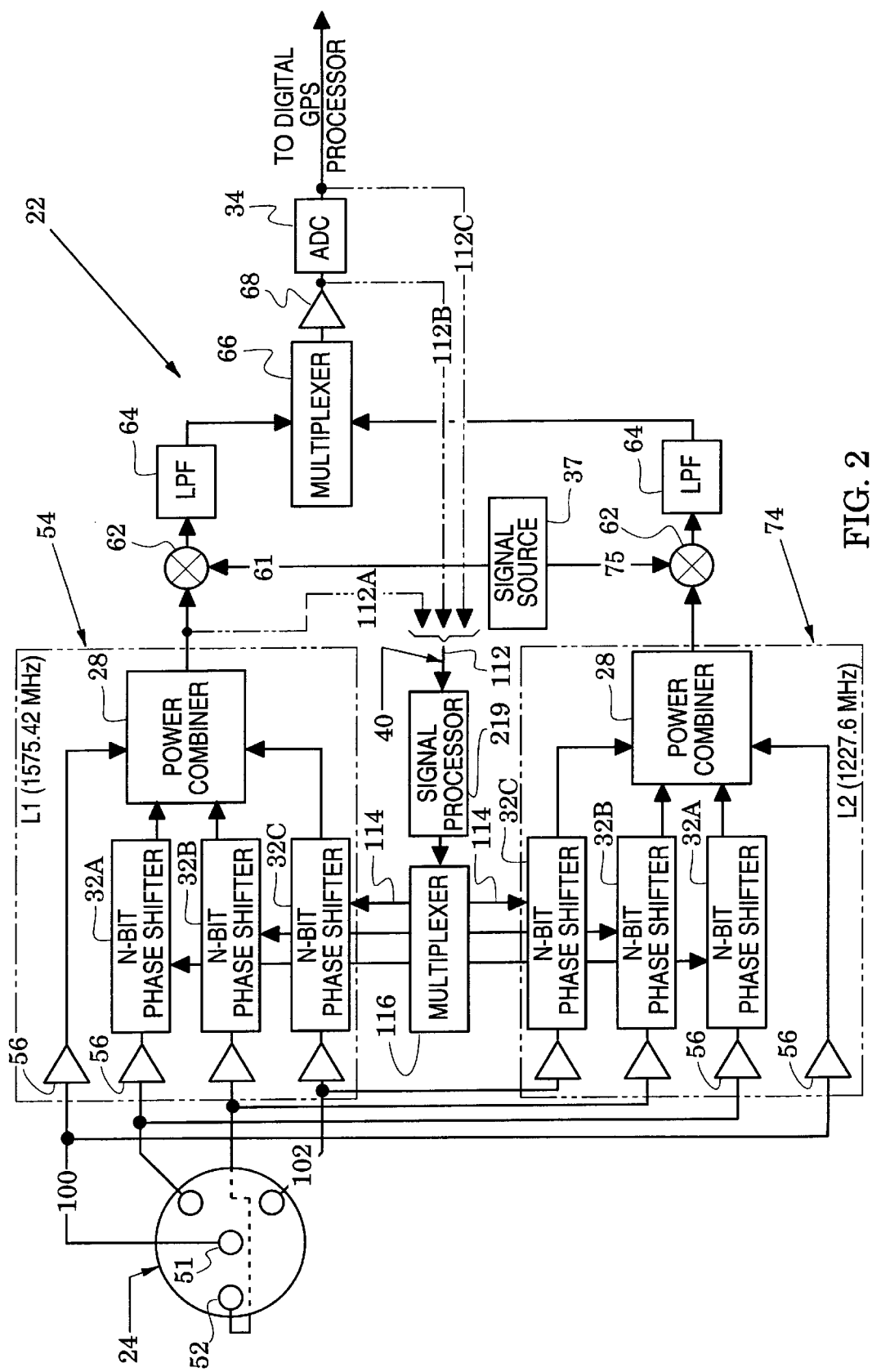
FIG. 2 is a detailed block diagram of a microwave downconverter system in the GPS receiver of FIG. 1.

FIG. 2 shows an exemplary embodiment of the antenna 24 of FIG. 1 that is formed with a reference antenna element 51 and three auxiliary antenna elements 52. In an L1 phase-shifting and signal-combining system 54, the reference antenna element 51 is coupled through a low-noise amplifier (LNA) 56 to the microwave power combiner 28 and the auxiliary antenna elements 52 are each coupled through other LNA's 56 and through a respective one of microwave phase shifters 32A–32C to the power combiner. The antenna 24 and the phase-shifting and signal-combining system 54 form an antenna system of the present invention.

A microwave signal source 37 (e.g., a frequency synthesizer) supplies a local oscillator signal 61 to downconvert the output of the power combiner 28 in a mixer 62. The downconverted signal from the mixer 62 is filtered in a low-pass filter 64 and passed to the ADC 34 through a multiplexer 66 and an intermediate-frequency amplifier 68.

The elements of the L1 phase-shifting and signal-combining system 54 are configured to operate at the L1 GPS carrier frequency (1575.42 MHz). FIG. 2 also illustrates an L2 phase-shifting and signal-combining system 74 which is similar to the L1 phase-shifting and signal-combining system 54 but whose elements are configured to operate at the L2 GPS frequency (1227.6 MHz). Another mixer 62 and low-pass filter 64 couple this downconverter and combiner to the multiplexer 66 and the signal source 37 supplies a local oscillator signal 75 to this latter mixer.

Any conventional antenna structure that generates a single signal in response to all polarization components of circularly-polarized GPS signals can be used for the reference antenna element 51 and the auxiliary antenna elements 52. For example, these elements can be the metallic patches 51 and 52 that are supported on a dielectric substrate 79 in FIG. 3.

Although the reference and auxiliary patches can be arranged in various ways to extend across and define an antenna array space 80, the exemplary arrangement of FIG. 3 places the auxiliary patches 52 on an imaginary circle 82 centered on the reference patch 51 and having a radius $\sim\lambda/2$ in which $\lambda$ is a GPS wavelength (e.g., the wavelength of one of the L1 and L2 signals or a wavelength that approximates these wavelengths). The three auxiliary patches are circumferentially spaced apart by substantially 120°.

FIG. 4 shows that the antenna 24 generates a substantially hemispherical antenna pattern 86 which is especially suitable for receiving GPS signals from the constellation of GPS satellites because these satellites constantly enter, move across and exit the sky dome above a GPS receiver.

In general, the antenna 24 receives a composite signal which includes at least one circularly-polarized GPS signal at one of the L1 and L2 frequencies and also includes one or more interference signals. As described above, the strength of a spread spectrum GPS signal is below a GPS receiver's thermal noise level. Therefore, the presence of an interference signal in the downconverter system 22 of FIG. 2 can be sensed by detecting whether the received signal (e.g., at the output of the power combiner 28 or at the ADC 34) is above the receiver's thermal noise level. If it is, an interference signal is known to be present; if not, there is no interference signal in the composite signal.

FIG. 4 shows an interference signal 90 traveling along an associated interference signal path 92. A constant phase plane 94 through the reference patch 51 will therefore be orthogonal to the path 92. It is thus apparent that first and second auxiliary patches 52A and 52B will have signal phases of $\psi_1$ and $\psi_2$ relative to the signal phase received by the reference patch 51.

Returning attention to FIG. 2, it is also apparent that if the signal received by the reference patch 51 is normalized and its reference phase arbitrarily set at 0°, the reference signal 100 can be expressed as 1 and an $i^{th}$ auxiliary signal 102 expressed as $e^{j\psi_i}$. With these designations, the received signals from the antenna 24 are, $$1, e^{j\psi_1}, e^{j\psi_2}, - - - e^{j\psi_N} \qquad (1)$$

for a generic antenna having N auxiliary antenna elements. If the paths from the auxiliary antenna elements to the power combiner 28 are arranged to realize an amplitude change of 1/N and if the phases introduced by N respective phase shifters are respectively set to $$e^{j(\pi-\psi_1)}, e^{j(\pi-\psi_2)}, - - - e^{j(\pi-\psi_N)}, \qquad (2)$$

then the signals of (1) above are converted to $$1, (1/N)e^{j\pi}, (1/N)e^{j\pi}, - - - (1/N)e^{j\pi} \qquad (3)$$

at the inputs to the power combiner 28. Because the reference signal is 1 and the sum of the phase-shifted auxiliary signals is $e^{j\pi}$, the combined signal out of the power combiner 28 is therefore reduced to zero (i.e., the interference signal has been nulled).

Accordingly, the downconverter system 22 of FIG. 2 has a feedback loop 40 with an input signal 112 that corresponds to the level of the combined signal and an output signal 114 that adjusts the phase shifters 32. The input signal 112 can be taken at any point which represents the output amplitude of the power combiner 28, e.g., the microwave input signal 112A, the intermediate-frequency input signal 112B or the digitized input signal 112C. The feedback loop 40 includes a multiplexer 116 that facilitates application of the output signal 114 to both of the L1 phase-shifting and signal-combining system 54 and the L2 phase-shifting and signal-combining system 74. The dual antenna systems facilitate tracking of a selected one of the L1 and L2 GPS signals.

Figure 5:
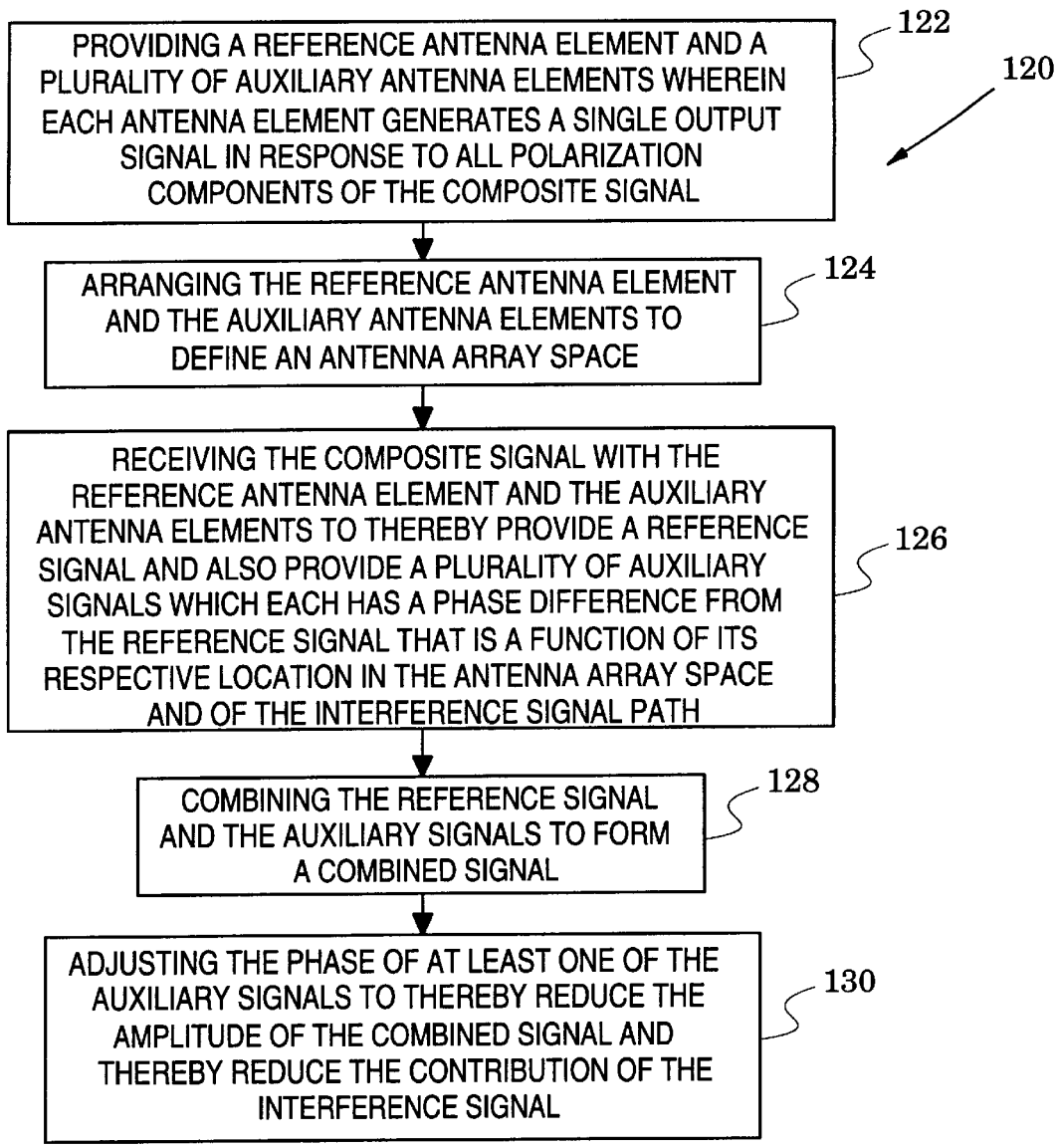
FIG. 5 is a flow diagram of process steps in the downconverter system of FIG. 2.

When an interference signal propagates along associated interference signal paths to the GPS receiver 20 of FIG. 1, the downconverter system 22 of FIG. 2 can therefore reduce its contribution to a received composite signal that includes the interference signal and at least one GPS signal. In its operation, the downconverter system follows the exemplary process steps of the flow chart 120 of FIG. 5.

In a first process step 122 of this flow chart, a reference antenna element and a plurality of auxiliary antenna elements are provided wherein each antenna element generates a single output signal in response to all polarization components of the composite signal (i.e., the process does not require the generation of signals from different polarization components such as vertical and horizontal components).

After the reference antenna element and the auxiliary antenna elements are arranged across an antenna array space in step 124, the composite signal is received in step 126 with the reference antenna element and the auxiliary antenna elements to provide a reference signal and a plurality of auxiliary signals. Each of the auxiliary signals has a phase difference from the reference signal that is a function of its respective location in the antenna array space and of the orientation of the interference signal path.

In a fourth process step 128, the reference signal and the auxiliary signals are combined to form a combined signal. In a final process step 130, the phase of at least one of the auxiliary signals is adjusted to thereby reduce the amplitude of the combined signal and thereby reduce the contribution of the interference signal.

FIG. 6 illustrates an exemplary patch antenna 134 for receiving the circularly-polarized GPS signals. The patch 134 has a geometrical center 136 and tap points 138 and 139 that are spaced from the center and located along orthogonally-related radial lines. The spacing from the center selects a desired impedance and the orthogonal locations cause the tap points to detect first and second orthogonally-polarized signals.

First and second feed paths 140 and 141 couple the tap points 138 and 139 to a patch feed line 144 that extends to one of the LNAs 56 of FIG. 2. The feed line 141 is taken along a path (indicated by a broken line) that generates a 90° phase shift relative to the feed line 140 so that the first and second orthogonally-polarized signals combine to form one of the reference signal 100 and the auxiliary signals 102 of FIG. 2. Thus a single signal is formed in response to all polarization components of the received signal. Although the patch 134 has been shown to have a circular pattern, any conventional patch pattern (e.g., the square pattern 148) can be used.

Although the antenna 24 of FIG. 3 illustrates three auxiliary antenna elements 52 arranged on one circle centered on a reference antenna element 51, the teachings of the invention may, in general, be practiced with any reference antenna element and auxiliary antenna elements that are arranged to define an antenna array space. In particular, these teachings can be practiced with the generic antenna 150 of FIG. 7 that has auxiliary antenna elements 152 located on imaginary concentric circles 154 centered on a reference element 156. Preferably, the auxiliary antenna elements 152 are also located on imaginary radial spokes 158. The use of additional auxiliary elements generally facilitates the reduction of multiple interference signals.

Although the antenna elements are arranged in FIG. 4 to extend across and define a planar antenna array space, the teachings of the invention may also, in general, be practiced with nonplanar or three-dimensional antenna array spaces. For example, the auxiliary antenna elements 52A and 52B of FIG. 4 can be positioned below the plane 160 of the reference antenna element 51 as shown in FIG. 8 to extend the antenna pattern 86 of FIG. 4 downward. As a result, an antenna pattern 162 of FIG. 8 is generated that may provide better reception of signals from GPS satellites that are proximate to the horizon.

Because the downconverter system 22 of FIG. 2 reduces the contribution of an interference signal to a received composite signal, it enhances processing of a GPS signal in the GPS digital processor 23 of FIG. 1. This may be a conventional GPS processor that has N digital receiver channels 180. In each of these channels, in-phase and quadrature (I, Q) signals are generated and used in integrate-and-dump circuits to form carrier and code tracking loops that determine velocity and position relative to the satellite.

Each of the receiver channels 180 is controlled by a receiver processor 182 to track the Doppler-shifted frequency of a GPS signal of a respective one of the received GPS satellites and correlate a replica PRN code with the code of that satellite's GPS signal. In addition, a navigation processor 184 operates on the navigation data of the GPS signal to determine the GPS satellite's position.

Completion of these processes on a sufficient number of different GPS signals (e.g., four) provides a calculated time and position and velocity of the GPS receiver and this information is made available through a user interface 186. The downconverted intermediate frequency supplied to the ADC 34 is adjusted high enough to support the PRN chipping frequency of the GPS signal and the GPS digital processor 23 typically receives other signals from the downconverter 22 (e.g., timing signals 188 from the signal source 37 of FIG. 1) to enable its operation.

In adaptive antenna systems, signals are typically said to be modified with "weights" which can be amplitude weights and/or phase weights. In the downconverter 22 of FIG. 2, the amplitude weights associated with the auxiliary antenna elements are preferably fixed. In particular, if the reference signal has a reference signal gain prior to the power combiner 28, then each of N auxiliary signals preferably has a gain substantially equal to 1/N times the reference signal gain. Therefore, given that the reference signal has a reference amplitude and the auxiliary signals have auxiliary amplitudes and the sum of the auxiliary amplitudes differs from the reference amplitude by an amplitude difference, then GPS receivers of the invention are configured to reduce, and preferably eliminate, the amplitude difference.

These gain or signal relationships will realize the amplitude relationship recited above in relationship (3) and can be accomplished in various portions of the reference signal path and the auxiliary signal paths (e.g., in the feed system of the antenna, in the gain of the LNAs and so on). In contrast, the phase weights are not fixed in receivers of the invention but are varied (as described, for example, in FIG. 5) to reduce the combined power from the power combiner 28.

In particular, the output power of the power combiner 28 is monitored and the phase shifters 32 adjusted to reduce that power. Generally, this process is continued to reduce the power combiner's output below a selected threshold. An exemplary threshold is the receiver's thermal noise level, e.g., thermal noise at the output of the LNAs 56 in FIG. 2. Since GPS signals are typically below a thermal noise threshold, a reduction of the composite signal to that threshold is an indication that the interference signal has been substantially nulled. That is, the antenna pattern 86 of FIG. 4 has been adjusted to define a null 190 along the interference signal path 92 and, accordingly, the contribution of the interference signal has been reduced to the selected threshold.

Because the interference signal path 92 is generally not known, the combined signal must be used as an indicator and possible combinations of the phase shifters (32 in FIG. 2) examined to find those that reduce the combined signal. They are further examined to determine the one or more combinations that reduce the signal below a selected threshold.

Figure 9:
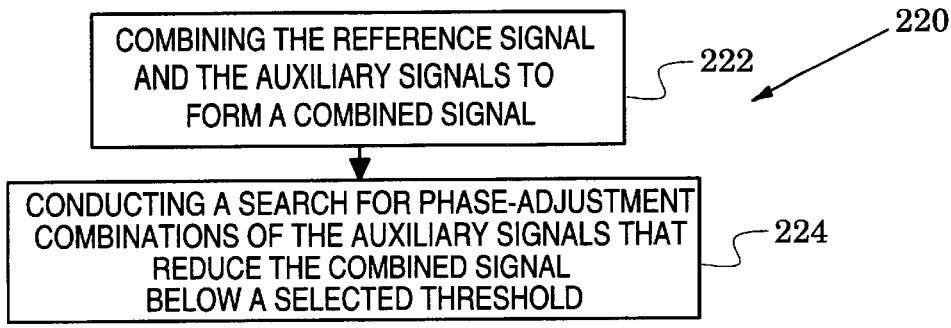
FIG. 9 is a flow diagram of additional process steps in the downconverter system of FIG. 2.

To facilitate reduction of interference signals, a signal processor (e.g., a microprocessor) 219 is preferably inserted in the feedback loop 40 of FIG. 2 and programmed in accordance with the flow diagram 220 of FIG. 9. The first process step 222 of this figure is the same as process step 128 of FIG. 5 and, in process step 224, a search is conducted for phase-adjustment combinations of the auxiliary signals that reduce the combined signal below a selected threshold.

GPS receivers with GPS antenna systems and methods have been disclosed for reducing the contribution of at least one interference signal while receiving a composite signal that includes that interference signal and at least one circularly-polarized GPS signal. These systems and methods use structures of minimal complexity that are economical to produce. Their fixed amplitude weights simplify the receiver structure while their phase weights are applied without requiring an expensive multiple downconverter structure.

When practicing the invention, the number of antenna elements can be selected in accordance with the number of interference signals to be reduced (i.e., greater number of interference signals generally requires greater number of antenna elements). Also, the number of phase settings (i.e., the number of bits) of the phase shifters 32 of FIG. 2 is a function of the depth and width of a realized antenna pattern null (e.g., the null 190 of FIG. 4) and can be selected accordingly.

The preferred embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A global positioning system (GPS) receiver for reducing a contribution of an interference signal while receiving a composite signal that includes said interference signal and at least one circularly-polarized GPS signal wherein said interference signal propagates along an associated interference signal path, the receiver comprising:

an antenna having a reference antenna element and a plurality of auxiliary antenna elements arranged across an antenna array wherein each antenna element generates a single output signal in response to all polarization components of said GPS signal and, in response to said composite signal, said reference antenna element provides a reference signal and said auxiliary antenna elements provide auxiliary signals which each has a phase difference from said reference signal that is a function of its respective auxiliary antenna element's location in said antenna array and of said interference signal path;

a plurality of phase shifters that are each coupled to vary the phase of a respective one of said auxiliary signals;

a power combiner coupled to said reference antenna element and to said phase shifters to combine said reference signal and said auxiliary signals into a combined signal;

a downconverter that reduces the frequency of said combined signal;

a digital GPS processor; and an analog-to-digital converter (ADC) that couples said downconverter to said GPS processor;

said phase shifters facilitating phase adjustment of at least one of said auxiliary signals to thereby reduce the amplitude of said combined signal and thereby reduce said contribution of said interference signal.

2. The GPS receiver of claim 1, further including:
a low-noise amplifier that couples said reference antenna element to said power combiner; and
a plurality of low-noise amplifiers that each couple a respective one of said auxiliary antenna elements to its respective phase shifter.

3. The GPS receiver of claim 1, wherein each of said reference antenna element and said auxiliary antenna elements is a patch antenna.

4. The GPS receiver of claim 1, wherein each of said auxiliary antenna elements is positioned on a respective one of a plurality of imaginary concentric circles centered on said reference element.

5. The GPS receiver of claim 1, wherein each of said auxiliary antenna elements is positioned on an imaginary circle centered on said reference element.

6. The GPS receiver of claim 5, wherein said plurality of auxiliary antenna elements is three auxiliary antenna elements that are spaced substantially 120° apart.

7. The GPS receiver of claim 1, wherein said antenna array is a planar array.

8. The GPS receiver of claim 1, wherein said antenna array is a three-dimensional array.

9. The GPS receiver of claim 1, wherein said digital GPS processor includes at least one digital receiver channel that has a code tracking loop and a carrier tracking loop for tracking the frequency and ranging codes of said GPS signal.

10. The GPS receiver of claim 1, further including a signal processor responsive to said ADC, said signal processor facilitating adjustment of said phase shifters to reduce said combined signal.

11. A global positioning system (GPS) receiver for reducing a contribution of an interference signal while receiving a composite signal that includes said interference signal and at least one circularly-polarized GPS signal wherein said interference signal propagates along an associated interference signal path, the receiver comprising:
an antenna having a reference antenna element and N auxiliary antenna elements arranged to define an antenna array wherein each antenna element generates a single output signal in response to all polarization components of said GPS signal and, in response to said composite signal, said reference antenna element provides a reference signal and said auxiliary antenna elements provide auxiliary signals which each has a phase difference from said reference signal that is a function of its respective auxiliary antenna element's location in said antenna array and of said interference signal path;
N phase shifters that are each coupled to vary the phase of a respective one of said auxiliary signals;
a power combiner coupled to said reference antenna element and to said phase shifters to combine said reference signal and said auxiliary signals into a combined signal;
a downconverter that reduces the frequency of said combined signal;
a digital GPS processor;
an analog-to-digital converter (ADC) that couples said downconverter to said GPS processor; and
a signal processor that is responsive to said ADC and facilitates adjustment of said phase shifters to reduce said combined signal and thereby reduce said contribution of said interference signal.

12. The GPS receiver of claim 11, wherein, prior to their combination in said power combiner, said reference signal has a reference signal gain and each of said auxiliary signals have an auxiliary signal gain substantially equal to 1/N times said reference signal gain.

13. A global positioning system (GPS) antenna system for reducing a contribution of an interference signal while receiving a composite signal that includes said interference signal and at least one circularly-polarized GPS signal wherein said interference signal propagates along an associated interference signal path, the receiver comprising:
an antenna having a reference antenna element and a plurality of auxiliary antenna elements arranged to define an antenna array wherein each antenna element generates a single output signal in response to all polarization components of said GPS signal and, in response to said composite signal, said reference antenna element provides a reference signal and said auxiliary antenna elements provide auxiliary signals which each has a phase difference from said reference signal that is a function of its respective auxiliary antenna element's location in said antenna array and of said interference signal path;
a plurality of phase shifters that are each coupled to vary the phase of a respective one of said auxiliary signals; and
a power combiner coupled to said reference antenna element and to said phase shifters to combine said reference signal and said auxiliary signals into a combined signal;
said phase shifters facilitating phase adjustment of at least one of said auxiliary signals to thereby reduce the amplitude of said combined signal and thereby reduce said contribution of said interference signal.

14. The GPS antenna system of claim 13, wherein each of said reference antenna element and said auxiliary antenna elements is a patch antenna.

15. The GPS antenna system of claim 14, wherein each of said reference antenna element and said auxiliary antenna elements includes:
a patch;
first and second tap points on said patch arranged to detect first and second orthogonally-polarized signals; and
a feed-line structure arranged to combine said first and second orthogonally-polarized signals into a single signal.

16. The GPS antenna system of claim 13, wherein each of said auxiliary antenna elements is positioned on a respective one of a plurality of imaginary concentric circles centered on said reference element.

17. The GPS antenna system of claim 13, wherein each of said auxiliary antenna elements is positioned on an imaginary circle centered on said reference element.

18. The GPS antenna system of claim 17, wherein said plurality of auxiliary antenna elements is three auxiliary antenna elements that are spaced substantially 120° apart.

19. The GPS antenna system of claim 13, wherein said antenna array is a planar array.

20. The GPS antenna system of claim 13, wherein said antenna array is a three-dimensional array.

21. A method of reducing a contribution of an interference signal to a received composite signal that includes said interference signal and at least one global positioning system (GPS) signal wherein said interference signal propagates along an associated interference signal path, the method comprising the steps of:
providing a reference antenna element and a plurality of auxiliary antenna elements wherein each antenna element generates a single output signal in response to all polarization components of said composite signal;

arranging said reference antenna element and said auxiliary antenna elements to define an antenna array;

receiving said composite signal with said reference antenna element and said auxiliary antenna elements to thereby provide a reference signal and also provide a plurality of auxiliary signals which each has a phase difference from said reference signal that is a function of its respective location in said antenna array and of said interference signal path;

combining said reference signal and said auxiliary signals to form a combined signal; and adjusting the phase of at least one of said auxiliary signals to reduce said combined signal and thereby reduce said contribution of said interference signal.

22. The method of claim 21, wherein said reference signal has a reference amplitude, said auxiliary signals have auxiliary amplitudes and the sum of said auxiliary amplitudes differs from said reference amplitude by an amplitude difference; and further including the step of selecting the amplitude of at least one of said reference signal and said auxiliary signals to reduce said amplitude difference and thereby reduce said contribution of said interference signal.

23. The method of claim 21, wherein each of said reference antenna element and said auxiliary antenna elements is a patch and further including the steps of:

arranging tap points on said patch to detect first and second orthogonally-polarized signals; and coupling said tap points with a feed-line structure that is arranged to combine said first and second orthogonally-polarized signals into a single signal.

24. The method of claim 21, wherein said arranging step includes the step of positioning each of said auxiliary antenna elements on a respective one of a plurality of imaginary concentric circles centered about said reference element.

25. The method of claim 21, wherein said arranging step includes the step of positioning each of said auxiliary antenna elements on an imaginary circle centered about said reference element.

26. The method of claim 25, wherein said plurality of auxiliary antenna elements is three auxiliary antenna elements and said positioning step includes the steps of spacing each of said auxiliary antenna elements substantially 120° apart.

27. The GPS antenna system of claim 21, wherein said antenna array is a planar array.

28. The GPS antenna system of claim 21, wherein said antenna array is a three-dimensional array.

29. The method of claim 21, further including the step of establishing a threshold signal level and wherein said adjusting step includes the step of reducing the amplitude of said combined signal below said threshold signal level.

* * * * *

UNITED STATES PATENT AND TRADEMARK OFFICE
CERTIFICATE OF CORRECTION

PATENT NO. : US 6,175,327 B1
DATED : January 16, 2001
INVENTOR(S) : Lin et al.

It is certified that error appears in the above-identified patent and that said Letters Patent is hereby corrected as shown below:

ON THE TITE PAGE
Item [73] Assignee is Sensor Systems, Inc., not Sensors Systems, Inc.

Signed and Sealed this

Twenty-ninth Day of May, 2001

*Attest:*

NICHOLAS P. GODICI

*Attesting Officer*     *Acting Director of the United States Patent and Trademark Office*